United States Patent [19]

Buck et al.

[11] 3,753,568

[45] Aug. 21, 1973

[54] RECORD PLAYBACK APPARATUS

[75] Inventors: Gordon H. Buck, Torrance; Jackie L. Nolan, Lawndale, both of Calif.

[73] Assignee: Mattel, Inc., Hawthorne, Calif.

[22] Filed: May 5, 1969

[21] Appl. No.: 821,772

[52] U.S. Cl. ................................ 274/11 R, 274/1 A
[51] Int. Cl. ......................... G11b 25/06, A63h 3/33
[58] Field of Search ....................... 274/1.1, 1.3, 1.4, 274/1.5, 1.6, 7, 8, 11 D, 11 E, 17

[56] References Cited

UNITED STATES PATENTS 3,482,842 12/1969 Danielsen et al. ................ 274/11 A

*Primary Examiner*—Louis R. Prince
*Assistant Examiner*—Steven L. Stephan
*Attorney*—Seymour A. Scholnick

[57] ABSTRACT

A record player with an endless record tape or band carrying several parallel sound tracks and a slot therein at the end of the tracks, including a mechanism operated by the slot for stopping the record player and rotating a cam to randomly select the groove in which the stylus will enter when the record player is restarted. The mechanism includes a shaft pivotally mounted on the record player housing, with an arm thereon which lies against the tape to move through the slot and thereby pivot the shaft. The shaft also carries a pawl that "flicks" the cam and a lug that separates switch contacts to de-energize the record player motor, when the shaft rotates as the arm moves through the record slot.

2 Claims, 5 Drawing Figures

INVENTORS
GORDON H. BUCK
JACKIE L. NOLAN

BY Max E. Shirk
ATTORNEY

INVENTORS
GORDON H. BUCK
JACKIE L. NOLAN

BY Max E. Shirk
ATTORNEY

RECORD PLAYBACK APPARATUS

BACKGROUND OF THE INVENTION

1. Field of the Invention

This invention relates to toy record playing apparatus.

2. Description of the Prior Art

One type of record player employs an endless tape or band with several parallel sound tracks that extend around most of the tape. The tape has a transition section between the end and beginning of the sound tracks, with a slot or other signalling means thereon for operating a mechanism to switch off the record player motor. The motor can be turned on again by manually depressing a bypass switch, and it then latches on until the transition section is reached again. While the transition section is being passed, a cam randomly selects a sound track to be engaged by a stylus, so that the particular track to be played each time is randomly selected.

A record player of this type is described in patent application Ser. No. 699,653 by Danielson et al. filed Jan. 22, 1968, now U.S. Pat. No. 3,482,842, assigned to the same assignee as the present application, and hereby incorporated by reference. That application describes a mechanism for engaging the slot in the record tape to de-energize the motor and rotate a stylus-positioning cam, which includes a pin that falls into the slot and is carried a short distance along with the tape. The pin pulls one switch contact away from the other to de-energize the motor, and pulls a pawl across a rim on the cam to rotate it. When the motor is manually restarted, with the pin still engaged in the slot, the pin rides up a ramp beneath the tape path until it is pushed out of the slot and flys back to its original position. While that mechanism successfully operates the record player, an even simplier and quieter mechanism would be desirable.

OBJECTS AND SUMMARY OF THE INVENTION

An object of the present invention is to provide a simple, quiet, and efficient mechanism for use in a toy record player to terminate its operation and to randomly select a new record track to be played when the player is restarted.

Another object is to provide an economical and reliable endless band record player.

In accordance with the present invention, a record player is provided which has an endless tape or band that carries several parallel record tracks, and a slot or other signalling means for indicating when the tape should be stopped. A mechanism which responds to the slot comprises a shaft with an arm thereon that bears against the tape, the arm falling into the slot to pivot the shaft. When the shaft pivots, a lug on the shaft separates electrical contacts to de-energize the record player motor. The particular record track to be engaged by a stylus is determined by the rotational position of a cam. The shaft carries a pawl that "flicks" a ratchet wheel rim portion on the cam, when the shaft pivots during engagement of the tape slot, to randomly select a new record track.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
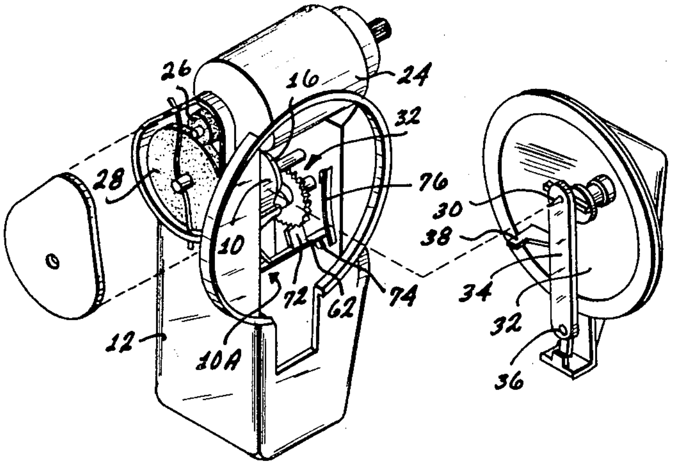
FIG. 1 is an exploded isometric view of a record playback apparatus constructed in accordance with the invention.
Figures 2, 3:
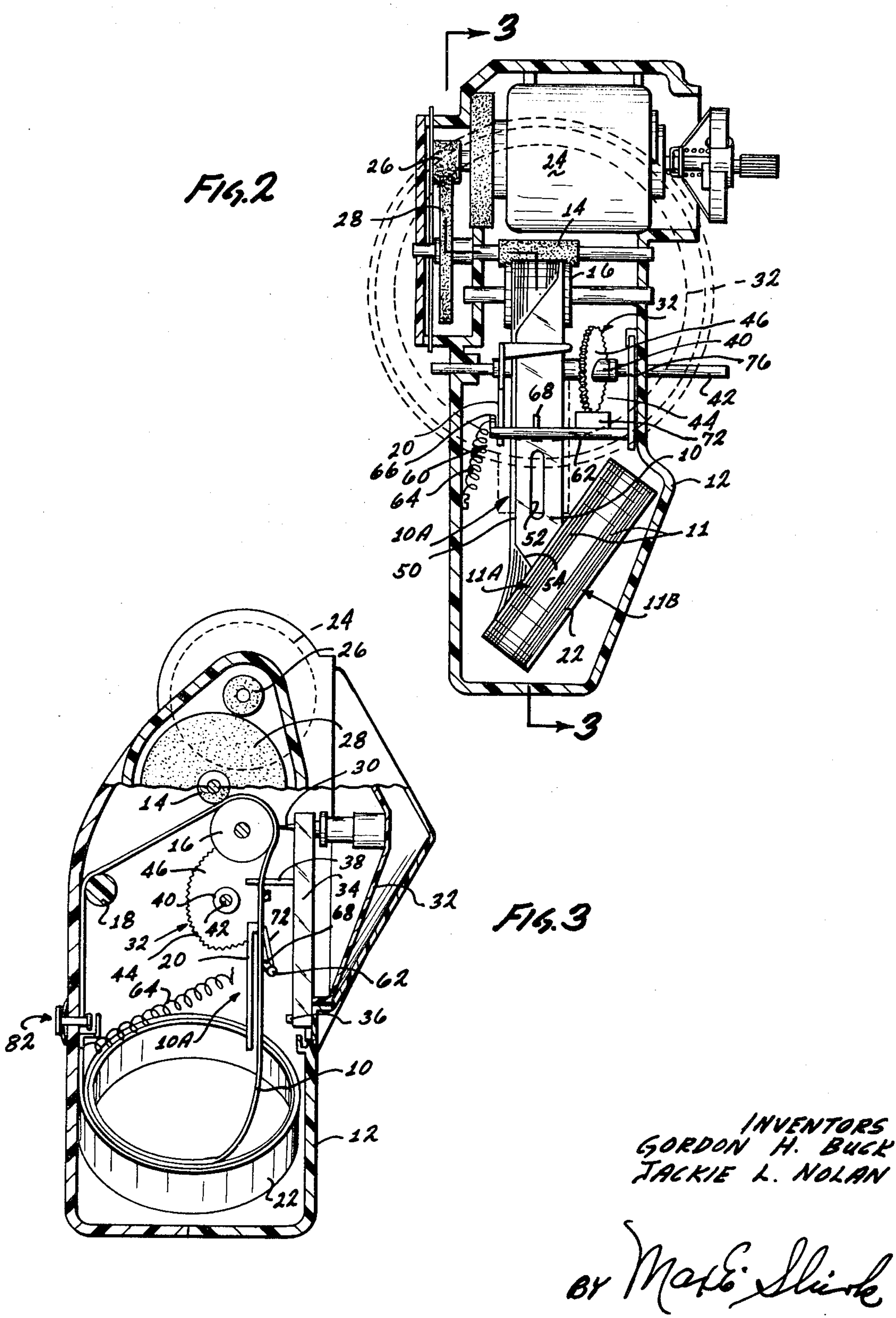
FIG. 2 is a front sectional view of the apparatus of FIG. 1.
FIG. 3 is a side sectional view of the apparatus of FIG. 1.

As shown in FIGS. 1, 2 and 3, the record playing mechanism includes a record 10 in the form of an endless tape or band with many parallel grooves or record tracks therein, contained in a housing 12. The band extends between a capstan 14 and roller 16, over a guide roller 18 and guide plate 20, and is fed into and removed from a supply roll 22. An electrically energized motor 24 drives the capstan 14 through friction wheels 26 and 28 to move the record band around its path. A stylus 30 engages one of the record tracks to play back the recording therein, the vibrations imparted to the stylus being accoustically amplified by a speaker cone 32 coupled to the stylus.

The tracks 11 in the record extend almost completely around the loop formed by the record, there being a short transition section of the record separating the beginning and end of the tracks. There are two sets of tracks, the set 11A on one side defining conversation sayings and the set 11B defining nursery rhyme sayings. Once the stylus enters the beginning of a track it continues along that track until the end thereof. The stylus then lies on the transition record section and can enter any of the other tracks when the transition section has passed and the stylus is at the beginning of the many tracks. The particular track that it will enter is determined by the position of a cam wheel 32.

The stylus 30 is mounted on an arm 34 that is pivoted at 36 on the cover which holds the speaker cone. A cam follower 38 mounted on the arm 34 abuts the cam wheel 32, so that one extreme lateral position of the stylus is determined by the cam. As will be described below, the stylus is lead along a groove in the transition section of the record at an angle toward the cam, until the follower 38 strikes the cam. The stylus enters the particular record track located at the lateral position where it is stopped by the cam.

The cam wheel 32 is a disc mounted in a skewed position on a bushing 40, the bushing 40 being freely rotatable on a shaft 42 that is mounted on the housing. The rim 44 of the disc is formed as a portion of a ratchet wheel. When the rim is flicked to rotate the cam, the cam face 46 presents a new portion to the stylus cam follower 38, that is a different distance from the record. By flicking the cam rim while the stylus moves over the transition section of the record, the next record track to be played can be chosen in a random manner. The cam wheel 32 can be grossly shifted by manual in-and-out movement of shaft 42 to enable selection of either conversation sayings defined in tracks 11A or rhymes defined in tracks 11B. However, the choice of a particular track within either of these two groups is randomly determined by the rotational position of the cam wheel to which it has been rotatably moved.

Figures 4, 5:
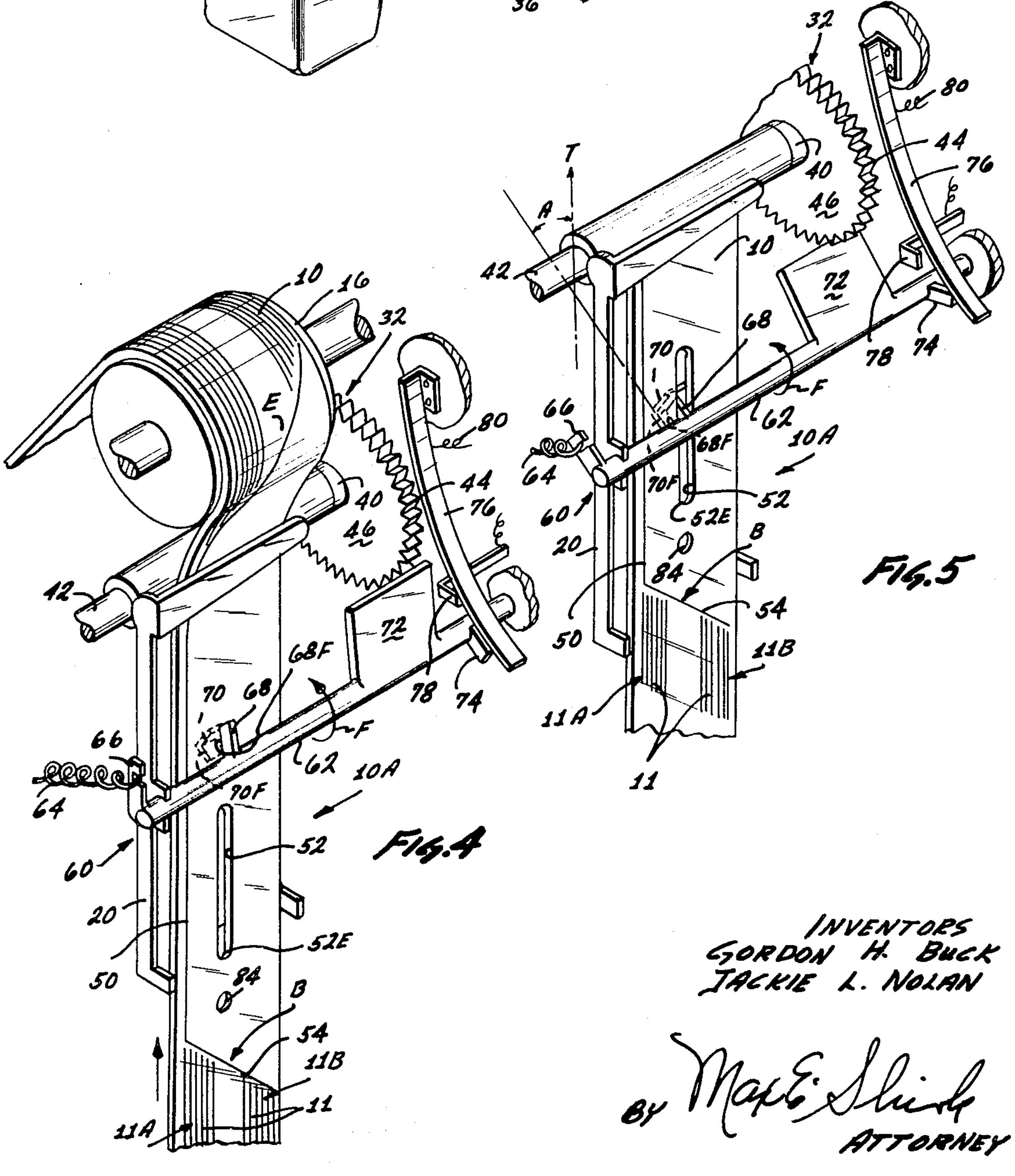
FIG. 4 is a partial perspective view of the apparatus of FIG. 1 just prior to stopping.
FIG. 5 is a view similar to that of FIG. 4 after stopping.

FIG. 4 illustrates details of the transition section 10A of the record. The transition section includes a transition groove 50 which receives the stylus after it passes the ends E of the sound tracks, and laterally shifts the stylus to a position furthest from the cam face 46. When a slot 52 in the record is reached, the motor that drives the capstan is de-energized and the record stops moving. When the motor is again energized, the groove 50 carries the stylus along an angled portion 54 toward the cam face, until the stylus abuts the cam face. The stylus then leaves the groove 50, and enters the beginning B of that groove which is at the same lateral position at which the stylus was forced from the angled portion 54 of the transition groove.

A switching mechanism or switching means is provided that can engage the slot 52 in the transition record portion 10A to stop the motor and rotate the cam wheel 32 to randomly select a record track. The switching means 60 includes a shaft 62 pivotally mounted at its ends and extending in a direction perpendicular to the motion of the record and in a plane parallel to that of the record. A spring 64 that engages a lug 66 on the shaft biases the shaft toward rotation in the forward direction indicated by arrow F. This urges the arm 68 on the shaft downward toward the guide plate 20 that lies below the record. The record generally lies between the arm and stationary guide plate, and it thereby prevents rotation of the shaft in the forward direction. However, when the record slot 52 reaches a position below the arm 68, as shown in FIG. 5, the arm moves through the slot and into a recess 70 in the guide plate. This allows the switching means to pivot to a limited extent in the forward direction.

As the switching means 60 pivots to the position of FIG. 5, a pawl 72 thereon "flicks" the rim 44 of the cam wheel 32 to rotate it to a new position. As described above, the face 46 of the cam determines which of several grooves on the record will be engaged by the stylus. The pivoting of the switching means 60 also causes a switch lug 74 on the shaft to raise an electrically conductive leaf 76 away from a conductor 78 to stop the motor. Prior to forward pivoting of the switching means 60, current from a battery to the motor flows through conductor 78 and leaf 76 and through an electrical wire 80. When the switching means is at its forward position, wherein it lifts the leaf 76 out of contact with the conductor 78, current stops flowing through the motor, and the motor and record driving mechanism coast to a stop. The slot 52 is made long enough so that a portion of it lies under the arm 68 when the device comes to a stop.

The motor is restarted by manually depressing a bypass switch such as a switch of a type shown at 82 in FIG. 3, to carry current to the motor even when conductors 76 and 78 are apart. When the motor has been turned on again for a brief time, the trailing end 52E of the slot 52 will pass the arm 68 and pivot it in the reverse direction back toward its original position shown in FIG. 4. This causes pawl 72 to again engage the cam wheel 32. A brief time later, the arm 68 falls into and rides out of a short slot or hole 84 in the tape, causing the pawl to again flick the cam wheel rim 44. The additional flick of the wheel is often useful in obtaining a random selection of tone arm positions where the cam wheel moves only a small fraction of a revolution at each flick. Additional holes may be provided before or after the slot 52, along the length of the record. The most forward wall 70F of the recess 70 stops the arm 68 at a position where its forward edge 68F makes an angle A of about 60° with the direction of travel T of the record. This allows the trailing edge 52E to more easily pivot the arm 68 backward, to reduce the danger of tearing the record at the edge 52E. The angle A should be no more than about 90°, or a right angle, or else tearing is likely to occur.

When the hole 84 passes the arm 68, the arm remains in the upward or back position, the pawl 72 thereon remains engaged with the cam wheel, and the lug 84 allows the leaf 76 to contact the conductor 78. The motor then continues to be energized regardless of operation of the bypass switch, until the slot 52 again comes below the arm 68. The switching mechanism can operate quietly, since the switching means 60 pivots only a limited distance. In addition, the mechanism causes only minimum stress on the record at the end 52 of the slot or of the hole in moving the arm 68, thereby reducing the likelihood of damage to the record.

Although particular embodiments of the invention have been described and illustrated herein, it is recognized that modifications and variations may readily occur to those skilled in the art, and consequently, it is intended that the claims be interpreted to cover such modifications and equivalents.

We claim:

1.

A phonograph comprising:

a housing;

a record having a surface provided with a sound recording thereon;

pick-up means for playing said recording;

motor means on said housing for moving said record past said pick-up means;

an arm pivotally mounted in said housing about an axis that is adjacent and parallel to said surface and perpendicular to the direction of record movement, said arm extending generally radially of said axis and having a movable end extending in the direction of record movement;

means biasing said arm to engage said movable end with said surface;

an opening in said surface into which said movable end may move, at a predetermined position of movement of said record;

means responsive to the angular position of said arm, about said axis, for controlling the operation of said motor means;

said arm being fixed to a shaft that is pivotally mounted on said housing and defining said axis;

said record having a plurality of substantially parallel tracks; and including a rotatably mounted cam for selectively engaging said pick-up means with one of said track; and pawl means mounted on said shaft to rotate said cam when said shaft pivots.

2. The phonograph described in claim 1 wherein said cam comprises a freely rotatably mounted cam wheel for positioning said pick-up means at one of said tracks selected in accordance with the rotational position of said cam wheel; and said pawl mounted on said shaft for rotation with it, to flick said cam wheel to a new rotational position.

* * * * *